United States Patent
Kamper et al.

(10) Patent No.: US 6,509,889 B2
(45) Date of Patent: *Jan. 21, 2003

(54) METHOD AND APPARATUS FOR ENABLING THE ADAPTATION OF THE INPUT PARAMETERS FOR A COMPUTER SYSTEM POINTING DEVICE

(75) Inventors: Robert Julian Kamper, Round Rock, TX (US); Michael Anthony Paolini, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,917

(22) Filed: Dec. 3, 1998

(65) Prior Publication Data

US 2002/0163502 A1 Nov. 7, 2002

(51) Int. Cl.⁷ .................................................. G09G 5/08

(52) U.S. Cl. ........................ 345/157; 345/163; 345/160

(58) Field of Search ................................ 345/145, 146, 345/173, 157, 163, 160

(56) References Cited

U.S. PATENT DOCUMENTS

| | | | | | |
|---|---|---|---|---|---|
| 4,725,829 | A | * | 2/1988 | Murphy | 340/709 |
| 5,012,231 | A | * | 4/1991 | Felsenstein | 340/709 |
| 5,326,940 | A | * | 7/1994 | Doubrava et al. | 178/18 |
| 5,598,183 | A | * | 1/1997 | Robertson et al. | 345/145 |
| 5,661,502 | A | * | 8/1997 | Cheng | 345/145 |
| 5,757,362 | A | * | 5/1998 | Levine | 345/166 |
| 5,825,351 | A | * | 10/1998 | Tam | 345/173 |
| 6,031,531 | A | * | 2/2000 | Kimble | 345/348 |
| 6,052,109 | A | * | 4/2000 | Sevigny | 345/145 |
| 6,052,110 | A | * | 4/2000 | Sciammarella et al. | 345/145 |
| 6,219,027 | B1 | * | 4/2000 | Shimizu et al. | 345/145 |
| 6,057,827 | A | * | 5/2000 | Matthews | 345/145 |

* cited by examiner

*Primary Examiner*—Richard Hjerpe
*Assistant Examiner*—Kim Nhung Nguyen
(74) *Attorney, Agent, or Firm*—Duke W. Yee; David A. Mims, Jr.; Stephen J. Walder, Jr.

(57) ABSTRACT

Smoothing a mouse pointer track on a screen is accomplished by smoothing mouse movement information using a spatial filtering function. Initially it is determined if the mouse movement information from a pointing device should be smoothed, and if so, which component of the movement information needs smoothing. Then the type of smoothing function is selected and applied to the mouse movement information. The smoothed mouse movement information is then added to the last mouse pointer position thereby smoothing the mouse pointer track.

60 Claims, 6 Drawing Sheets

| Submission | delta X | delta Y | $X_{Raw}$ | $\Xi Y_{Raw}$ | $XY_{RA}$ | $Y_{RA}$ | $\Xi Y\%$ | $Y\%$ | $XY_{SCALER}$ | $Y_C$ |
|---|---|---|---|---|---|---|---|---|---|---|
| 1 | 1 | 0 | 25 | 0 | 25 | 0 | 25 | 0 | 25 | 0 |
| 2 | 5 | 2 | 30 | 2 | 25.6 | 1 | 29.75 | 2 | 29 | 2 |
| 3 | 7 | 3 | 37 | 5 | 26.9 | 2.666667 | 36.4 | 4.85 | 35 | 4 |
| 4 | -4 | 6 | 33 | 11 | 27.8 | 5.416667 | 32.6 | 10.55 | 32 | 9 |
| 5 | -2 | 2 | 31 | 13 | 28.5 | 8.016667 | 30.6 | 12.55 | 30 | 11 |
| 6 | 5 | 4 | 36 | 17 | 29.7 | 10.85 | 35.35 | 16.35 | 34 | 14 |
| 7 | 7 | -2 | 43 | 15 | 31.6 | 12.99286 | 42 | 14.35 | 40 | 12 |
| 8 | -1 | 7 | 42 | 22 | 33.4 | 15.74286 | 41 | 21 | 39 | 18 |
| 9 | 7 | 2 | 49 | 24 | 33.62936 | 18.40952 | 47.65 | 23 | 45 | 20 |
| 10 | -6 | -7 | 43 | 17 | 35.52936 | 20.10952 | 41.95 | 16.35 | 40 | 14 |
| 11 | 6 | 4 | 49 | 21 | 37.92936 | 22.20952 | 47.65 | 20.15 | 45 | 17 |
| 12 | 0 | 0 | 49 | 21 | 39.82936 | 24.10952 | 47.65 | 20.15 | 45 | 17 |
| 13 | -2 | 4 | 47 | 25 | 40.82936 | 26.10952 | 45.65 | 23.95 | 43 | 20 |
| 14 | -7 | 8 | 40 | 33 | 41.52936 | 28.30952 | 39 | 31.55 | 37 | 27 |
| 15 | -2 | 5 | 38 | 38 | 42.22936 | 30.80952 | 37 | 36.3 | 35 | 31 |
| 16 | -7 | 1 | 31 | 39 | 41.72936 | 33.00952 | 30.35 | 37.3 | 29 | 32 |
| 17 | 0 | 7 | 31 | 46 | 40.52936 | 36.10952 | 30.35 | 43.95 | 29 | 38 |
| 18 | 3 | 2 | 34 | 48 | 39.72936 | 38.70952 | 33.2 | 45.95 | 31 | 40 |
| 19 | -4 | -5 | 30 | 43 | 37.82936 | 40.60952 | 29.4 | 41.2 | 28 | 36 |
| 20 | 3 | 4 | 33 | 47 | 36.82936 | 43.60952 | 32.25 | 45 | 30 | 39 |
| 21 | -4 | 3 | 29 | 50 | 34.82936 | 46.50952 | 28.45 | 47.85 | 27 | 41 |
| 22 | 2 | -5 | 31 | 45 | 33.02936 | 48.90952 | 30.45 | 43.1 | 29 | 37 |
| 23 | -4 | -1 | 27 | 44 | 31.02936 | 50.80952 | 26.65 | 42.1 | 26 | 36 |
| 24 | -2 | -2 | 25 | 42 | 29.52936 | 51.70952 | 24.65 | 40.1 | 24 | 34 |
| 25 | -2 | -2 | 23 | 40 | 28.02936 | 51.90952 | 22.65 | 38.1 | 22 | 32 |
| 26 | -2 | -2 | 21 | 38 | 27.02936 | 51.80952 | 20.65 | 36.1 | 20 | 30 |
| 27 | -2 | -2 | 19 | 36 | 25.82936 | 50.80952 | 18.65 | 34.1 | 18 | 28 |
| 28 | -2 | -2 | 17 | 34 | 24.12936 | 49.40952 | 16.65 | 32.1 | 16 | 26 |
| 29 | -2 | -2 | 15 | 32 | 22.62936 | 48.30952 | 14.65 | 30.1 | 14 | 24 |
| 30 | -2 | -2 | 13 | 30 | 20.62936 | 46.60952 | 12.65 | 28.1 | 12 | 22 |
| 31 | -2 | -2 | 11 | 28 | 18.82936 | 44.40952 | 10.65 | 26.1 | 10 | 20 |
| 32 | -2 | -2 | 9 | 26 | 16.62936 | 42.50952 | 8.65 | 24.1 | 8 | 18 |
| 33 | -2 | -2 | 7 | 24 | 14.62936 | 40.50952 | 6.65 | 22.1 | 6 | 16 |
| 34 | -2 | -2 | 5 | 22 | 12.62936 | 38.50952 | 4.65 | 20.1 | 4 | 14 |
| 35 | -2 | -2 | 3 | 20 | 10.62936 | 36.50952 | 2.65 | 18.1 | 2 | 12 |
| 36 | 7 | 4 | 10 | 24 | 9.529358 | 35.10952 | 9.3 | 21.9 | 8 | 15 |
| 37 | -5 | -7 | 5 | 17 | 8.129358 | 33.20952 | 4.55 | 15.25 | 4 | 9 |
| 38 | 9 | 7 | 14 | 24 | 7.829358 | 32.20952 | 13.1 | 21.9 | 12 | 15 |
| 39 | -6 | -6 | 8 | 18 | 7.129358 | 30.80952 | 7.4 | 16.2 | 7 | 10 |
| 40 | 3 | 2 | 11 | 20 | 6.929358 | 29.80952 | 10.25 | 18.2 | 9 | 12 |
| 41 | -7 | -8 | 4 | 12 | 6.229358 | 28.20952 | 3.6 | 10.6 | 3 | 5 |
| 42 | 8 | 4 | 12 | 16 | 6.529358 | 27.20952 | 11.2 | 14.4 | 10 | 8 |
| 43 | -3 | -6 | 9 | 10 | 6.729358 | 25.80952 | 8.35 | 8.7 | 8 | 3 |
| 44 | 7 | 0 | 16 | 10 | 7.829358 | 24.60952 | 15 | 8.7 | 14 | 3 |
| 45 | -4 | -7 | 12 | 3 | 8.729358 | 22.90952 | 11.2 | 2.05 | 11 | -3 |
| 46 | 8 | 2 | 20 | 5 | 9.729358 | 21.00952 | 18.8 | 4.05 | 18 | -1 |
| 47 | -6 | -7 | 14 | -2 | 10.62936 | 19.10952 | 13.1 | -2.6 | 13 | -7 |
| 48 | 9 | 3 | 23 | 1 | 11.52936 | 16.80952 | 21.65 | 0.25 | 21 | -5 |
| 49 | -2 | -6 | 21 | -5 | 12.82936 | 14.50952 | 19.65 | -5.45 | 19 | -10 |
| 50 | 4 | 2 | 25 | -3 | 14.22936 | 12.20952 | 23.45 | -3.45 | 22 | -8 |

METHOD AND APPARATUS FOR ENABLING THE ADAPTATION OF THE INPUT PARAMETERS FOR A COMPUTER SYSTEM POINTING DEVICE

BACKGROUND OF THE INVENTION

1. Technical Field

The present invention relates in general to a method and system for data processing, and in particular to a method and system for processing data input to a data processing system utilizing an input device having a number of keys. Still more particularly, the present invention relates to a method and system for selectively smoothing a computer system pointing device.

2. Description of Related Art

Prior art, such as disclosed in Cheng, U.S. Pat. No. 5,661,502, "Self-Adjusting Digital Filter for Smoothing Computer Mouse Movement", filed Feb. 16, 1996, is incorporated by reference in its entirety here within.

Graphical user interfaces, or "GUIs" as they are often designated, have become an increasingly common and popular feature of computers, especially personal computers (PCs). One of the many advantages of such GUIs is that they allow a user to enter commands by selecting and manipulating graphical display elements, such as icons, usually with a pointing device, such as a mouse. A mouse is an input device which, when moved over a surface, moves a mouse pointer across the computer display in a corresponding manner. Typically, a mouse has at least one to three buttons which when pressed, generate to the computer an input relating the user and the location of the mouse on the computer display. "Clicking" will be used herein to refer to the pressing and releasing of a mouse button, usually the left mouse button, unless otherwise specified. The icons of a GUI are designed to behave in a manner similar to the objects they represent. The Apple Macintosh user interface, Microsoft Windows operating environment, and UNIX X-Windows are common and very popular examples of GUIs, illustrating the fact that the advantages of GUIs over conventional text-based user interfaces are widely recognized.

Clearly, GUIs significantly reduce the amount of information that a user must recall in order to use the computer effectively. For example, instead of having to remember the name of an application program and navigate by manual typing, the user can search files and launch applications in a more intuitive manner, such as by clicking on well organized buttons and icons. As a result of the ever-increasing popularity of GUIs, a variety of different means for organizing and navigating through the various applications and other programs have been developed.

Organizing means, as referred to above, might be a drop-down or pull-down menu. Drop-down menus are activated by moving the mouse pointer over an active area on a menu. While there can be variations on the menu theme, one such embodiment requires a user to click a button when the mouse is positioned over an active menu. When the application controlling the menu receives the position information of the mouse pointer and the click from the user, the active menu is expanded or dropped down uncovering the menu options of the particular menu type. From those options a user is required to move the mouse to a specific option and click on that option.

While the drop-down menu saves desktop space by only expanding a menu upon a specific action by the user, it has a disadvantage of being somewhat cumbersome for those who do not possess the manual dexterity needed to accurately control the mouse pointer on the screen. Because the drop-down menu, or expanded menu options, stays active only when the pointer is located over the hot spot created by the drop-down menu, if the user allows the pointer to move off of that drop-down menu, the menu automatically closes and the user is forced to reinitiate the drop-down menu procedure described above.

Various methods and apparatus currently exist for allowing a user to control certain aspects of computer mouse operation. For example, the Windows interface enables a user to access a mouse dialog box whereby he can adjust the tracking speed, which refers to the speed at which the mouse pointer moves across the display, and double click speed, which refers to the rate at which Windows recognizes double clicks of the mouse. One feature of the mouse that is not controllable using the Windows GUI is the responsiveness of the mouse pointer displayed on the display to mouse movement. Clearly, such a feature would be beneficial for use in connection with any type of user interface, but would be especially useful in connection with GUIs having small buttons and GDEs, such as the drop-down menu interface described above. Providing means by which a user can control the responsiveness of the mouse pointer provides him with the capability to prevent, or at least reduce the possibility, of overshoot. It will be recognized, therefore, that this feature would be especially beneficial in cases where the user is a small child or an older person, neither of whom typically have the manual dexterity necessary to accurately control a mouse or other input device and hence the position of the pointer on the display.

There are a set of disabilities that make the regular operation of a computer difficult, if not impossible. Examples of this are trembling hands/fingers, and numb hands, fingers (which can cause the repeated pressing of a key on the keyboard, or a button on a pointing device). As our population grows older and becomes increasingly dependent on computers, this will become more of an issue.

The solution for this is typically one of two things. 1) The enablement of what is called Slow Keys or Bouncy Keys for the keyboard input device termed "Mouse Keys" which is the enablement of the number-pad to function as mouse input. Since it is still part of the keyboard, Slow Keys or Bouncy Keys can apply to these "Mouse Keys", 2) The use of mouse keys alone, no tremble occurs in the mouse movement since it is generated off of a key stroke, 3) The creation of new input devices (other than keyboard, and traditional pointing devices).

Therefore, what is needed is a mechanism for enabling the user to control the responsiveness of a mouse, and thereby limit the amount of overshoot that can occur.

SUMMARY OF THE INVENTION

An advantage of the present invention is that the filtering method is spatial rather than temporal in nature.

Another advantage of the present invention is that the user may select the smoothing method.

Another advantage of the present invention is that the smoothing method may be selected or modified by the operating system or the application being processed.

Another advantage of the present invention is that two or more smoothing methods may be executed sequentially.

Another advantage of the present invention is that smoothing methods may be implemented entirely in the device driver rather than in the operating system.

Another advantage of the present invention is that smoothing method and the smoothing parameters within the method may be selected by the user.

Another advantage of the present invention is that the invention described here consists of a method to smooth the movement of a pointing device so that barriers to adept use of the tool are removed for certain types of users. Such users would include novices, individuals with poor fine motor movement control, individuals with medical conditions or symptoms that cause involuntary tremors or motion that would be translated to movement of the pointing device using the ordinary settings for control. Use of the invention would provide several advantages, including reduction of errors in input, increased usability and user satisfaction with computer system use, individually customizable settings for individual users of the same hardware, and adaptability of the computer system to changes in the user's physical condition or behavior.

The present invention provides a novel spatial filtering process for smoothing a mouse pointer track on a screen. Initially it is determined if the movement information from a pointing device should be smoothed, and if so, which component. Then the type of smoothing is selected and applied to the movement information which is added to the last mouse pointer position.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a tabular listing illustrating the results of several possible smoothing algorithms on the mouse pointer position;

DETAILED DESCRIPTION OF THE PREFERRED EMBODIMENT

Figure 1:
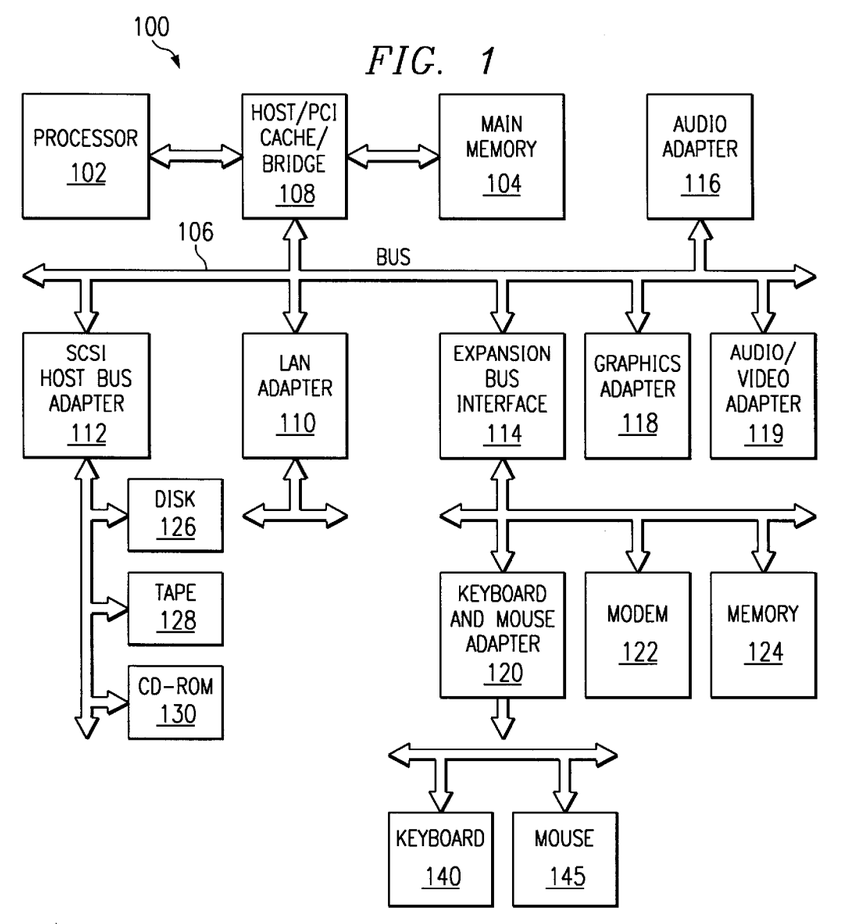
FIG. 1 is a block diagram of a data processing system in the present invention which may be implemented.

FIG. 1 is a block diagram of a data processing system in the present invention which may be implemented.

With reference now to the figures, and in particular with reference to FIG. 1, a block diagram of a Data Processing System 100 in which the present invention may be implemented is illustrated. Data Processing System 100 employs a peripheral component interconnect (PCI) local bus architecture. Although the depicted example employs a PCI bus, other bus architectures such as Micro Channel and ISA may be used. Processor 102 and Main Memory 104 are connected to PCI Local Bus 106 through PCI Bridge 108. PCI Bridge 108 also may include an integrated memory controller and cache memory for Processor 102. Additional connections to PCI Local Bus 106 may be made through direct component interconnection or through add-in boards. In the depicted example, Local Area Network (LAN) adapter 110, SCSI Host Bus Adapter 112, and Expansion Bus Interface 114 are connected to PCI Local Bus 106 by direct component connection. In contrast, Audio Adapter 116, Graphics Adapter 118, and Audio/Video Adapter (A/V) 119 are connected to PCI Local Bus 106 by add-in boards inserted into expansion slots. Expansion Bus Interface 114 provides a connection for a Modem 122, additional Memory 124 and Keyboard and Mouse Adapter 120. Keyboard Mouse Adapter 120 contains the I/O controller needed to issue interrupts in order to notify the Microprocessor 102 of a state change of either the Keyboard 140 or the Mouse 145.

Upon user mouse action, the onboard mouse microprocessor detects the movement in x-axis direction or y-axis relative to the mouse. The microprocessor issues a scan code associated with mouse movement in the direction of a relative axis of the mouse device. Those scan codes are sent to the I/O controller within the Keyboard and Mouse Adapter 120. Generally, signals coming from the microprocessor on the mouse consists of movement information relative to each mouse axis in both the X and Y axis directions. The I/O controller issues an interrupt to Processor 102, alerting the processor of a scan code from the Mouse 140. While in this embodiment a mouse is used as the pointing device, other pointing devices such as a trackball, touch pad or gesturing device could also be used.

SCSI Host Bus Adapter 112 provides a connection for Hard Disk Drive 126, Tape Drive 128, CD-ROM 130, and digital video disc read only memory drive (DVD-ROM) 132 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

In FIG. 1, prior art methods of smoothing a mouse movement rely heavily on the speed of the mouse movement. This is because it has always been assumed that a valid input from a user-directed mouse is a slow, deliberate input. Conversely, an invalid movement, such as a tremble or a jerking motion on the mouse, was assumed to be faster and more random in nature. Therefore, prior art smoothing was applied to mouse movement by suppressing or smoothing the mouse pointer inertia by selecting an inertial constant, either by the user, depending on how much smoothing the user intends for a given speed of the mouse, or alternatively could be calculated internally from the speed of the mouse.

As a user directs the mouse or pointer motion with his hand, simultaneously on the screen a screen or mouse pointer moves in a corresponding fashion to the pointing device actuated by the user. While the corresponding screen motion of the mouse pointer does not necessarily have a one-to-one correlation between the magnitude of the motion of the pointing device, it is usually some linear function of the pointer device motion. Therefore, any movement of the pointing device, whether intended or unintended, will result in a corresponding movement of the mouse pointer. In the prior art, the speed of the mouse was solely used to determine which user movements were considered to be deliberate and which user movements were considered not to be deliberate or unintended. An inertial variable or constant was applied against the onscreen pointer coordinates depending on the speed of the user directed pointer movements.

Figure 2:
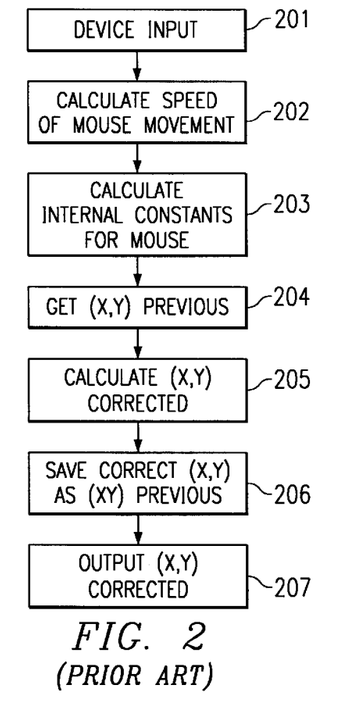
FIG. 2 illustrates prior art method of dynamically adjusting the inertial constants for smoothing an onscreen pointer.

FIG. 2 illustrates prior art method of dynamically adjusting the inertial constant for smoothing an onscreen pointer. The process starts with a device input (step 201). The speed at which the mouse is moving is calculated at step 202. The calculated mouse speed and inertial constant is calculated (step 203). Next, the previous (X,Y) screen values are gathered (step 204) and calculated (X,Y) screen coordinates were corrected using the inertial constant in the old (X,Y) screen coordinates. The (X,Y) screen coordinates are then saved (step 206) and the new (X,Y) screen coordinates that were corrected using the inertial constant are then output (step 207).

In the prior art rather than adding $\Delta X$ and $\Delta Y$ values to the previous (X,Y) coordinate of the mouse pointer calculates a current mouse pointer position from past (X,Y) mouse position and then applies an inertial constant to the new position thereby correcting the new mouse printer position for unintended mouse movement by the speed at which the mouse moved. So, rather than correcting the $\Delta X$ and $\Delta Y$ movement values themselves, the actual screen position of the mouse is corrected by the speed at which the mouse has moved.

Figure 3:
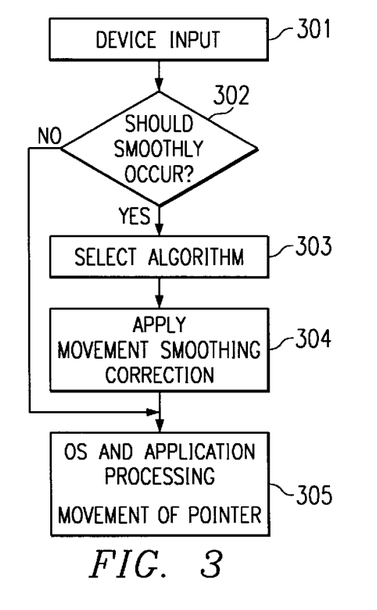
FIG. 3 illustrates one method of implementing the present invention.

FIG. 3 illustrates one method of implementing the processes of present invention. The method begins by a device input signal such as from some sort of pointing device—a mouse, trackball, touch pad, etc. (step 301). Once the input is realized, a decision must be made as to whether smoothing should occur (step 302). The decision to smooth or not to smooth might be a function entirely at the discretion of the user. However, in one embodiment of the present invention, the determination to smooth may be a function of either the operating system or the application.

In certain situations, smoothing could be applied even without the user's knowledge. For instance, as the screen pointer crossed a hot spot or a selected area on the screen which is under the control of an application running on an operating system, the smoothing function might be invoked by the application. In another embodiment the device driver or the operating system may invoke the smoothing function depending on the $\Delta Y$ value which has been generated by the device input.

However, if it is decided that no smoothing should occur the $\Delta X$ and $\Delta Y$ values from the device input are delivered directly to the operating system and application processing (step 305) for conversion to screen pointer coordinates.

If, on the other hand, the decision is made to smooth, the next decision is to select the appropriate algorithm (step 303). The present invention envisions several possible smoothing algorithms, the simplest of which is merely to reduce the $\Delta X$ and $\Delta Y$ values by some scale amount.

$$(X, Y)_{new} = (X_{last} + (\Delta X - S)), (Y_{last} + (\Delta Y - S))$$

if $|\Delta X - S| < N$;
  then $X_{new} = X_{last} + \Delta X$
if $|\Delta Y - S| < N$;
  then $Y_{new} = Y_{last} + \Delta Y$ The second possibility is to reduce the $\Delta X$ and $\Delta Y$ values by some percentage amount.

$$(X, Y)_{new} = (X_{last} + (\Delta X \cdot R)), (Y_{last} + (\Delta Y \cdot R))$$

if $|\Delta X \cdot R| < N$;
  then $X_{new} = X_{last} + \Delta X$
if $|\Delta Y \cdot R| < N$;
  then $Y_{new} = Y_{last} + \Delta Y$ While in the examples below both the scaler reduction and the percentage reduction to $\Delta X$ and $\Delta Y$ are identical amounts for both $\Delta X$ and $\Delta Y$, in some cases it might be advantageous to use a separate smoothing factor for both the X and the Y directions.

A third method is a rolling average method.

$$(X, Y)_{new} = (X_{last} + \Delta X_{rolling\ average}), (Y_{last} + \Delta Y_{rolling\ average})$$

$$\Delta X_{rolling\ average} = (\Delta X + \Delta X_{last} + \ldots + \Delta X_i)/i$$

$$\Delta Y_{rolling\ average} = (\Delta Y + \Delta Y_{last} + \ldots + \Delta Y_i)/i$$

where i is an integer greater than 1

In this method a number, i, of $\Delta X$ and/or $\Delta Y$ values are maintained in separate rolling buffers. The rolling buffer is a memory device which holds a predetermined number of submissions. As or before a new submission can be stored in the rolling buffer, the oldest submission must be deleted from the buffer. The smoothed values are calculated by taking the number of submissions, (i) in either the X or the Y rolling buffer, summing that total and dividing that total by the i. Before the device inputs new submissions of $\Delta X$ and $\Delta Y$, the oldest submission, ($\Delta X_i$ or $\Delta Y_i$), is dropped and the new submission is added to the rolling buffer.

In the preferred embodiment, ten submissions are held in the rolling buffer and the scaling factor is a factor of ten, i=10. The value of i could be any suitable integer depending on the desired smoothing effect. The greater the number of submissions held in the rolling buffer, i, the more smoothing and, consequently, the greater the magnitude of the mouse movement needed for a corresponding response on the screen. Conversely, the lower the number of submissions, the less smoothing occurs to the mouse pointer.

Once the algorithm is selected in step 303, the movement correction is applied to the $\Delta X$ and $\Delta Y$ values (step 304). The smooth $\Delta X$ and $\Delta Y$ are then delivered to the operating system in application processing (step 305). From there the movement of the screen pointer is determined and displayed on the screen. It is further envisioned that more than one algorithm could be combined for desired smoothing effect.

In the preferred embodiment, $\Delta X$ and $\Delta Y$ are smoothed generally using the same algorithm, however, other embodiments might smooth one component or dimension of the movement information, using a first algorithm and smooth another component or dimension of the movement information using a second algorithm. This procedure could be further carried to a third component or dimension using a third algorithm if desired.

Figure 4:
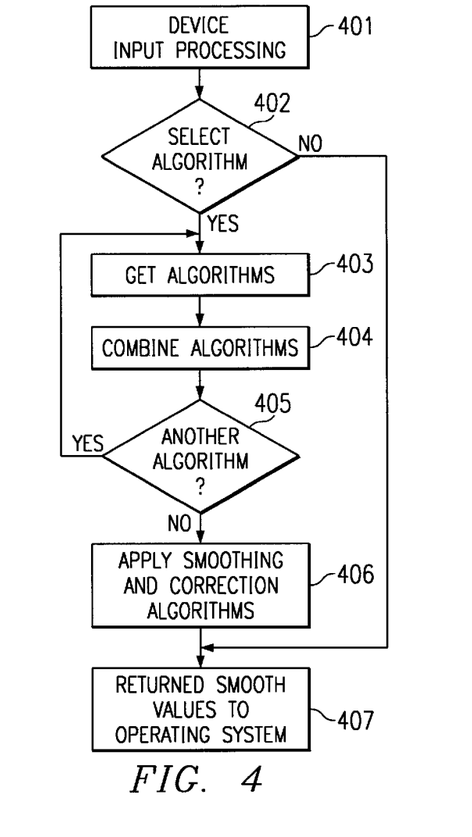
FIG. 4 illustrates a method of selecting and combining smoothing algorithms used in the present invention.

FIG. 4 illustrates a method of selecting and combining smoothing algorithms used in the present invention. As has been previously shown, the method starts with a device input processing (step 401). Again, a decision must be made as to whether an algorithm is to be selected for smoothing (step 402). As in the previous example, if no algorithm is selected, the $\Delta X$ and $\Delta Y$ values are delivered straight to the operating system and application processing. If it is decided to select an algorithm, the algorithm is actually acquired (step 403).

Once acquired, the algorithm is combined with any other resident smoothing algorithms (step 404) and another check is made to determine whether another smoothing algorithm is necessary (step 405). If another smoothing algorithm is necessary, the process is returned to block 403 and that algorithm is acquired and again combined with the other algorithms that have been selected. At some point, the decision is made not to select another algorithm in step 405. Then, the $\Delta X$ and $\Delta Y$ values are smoothed by applying the smoothing and correction algorithms which were selected in step 403.

Again, because a possibility exists that more than one smoothing algorithm might be combined, each algorithm must be applied to the smoothed $\Delta X$ and $\Delta Y$ values from the predecessor algorithm rather than the raw $\Delta X$ and $\Delta Y$ values which were generated by the input device (step 406). Once the $\Delta X$ and $\Delta Y$ values are smoothed by the selected algorithms, these values are delivered to the operating system and application processing for transformation to screen position (step 407).

Figures 5, 6:
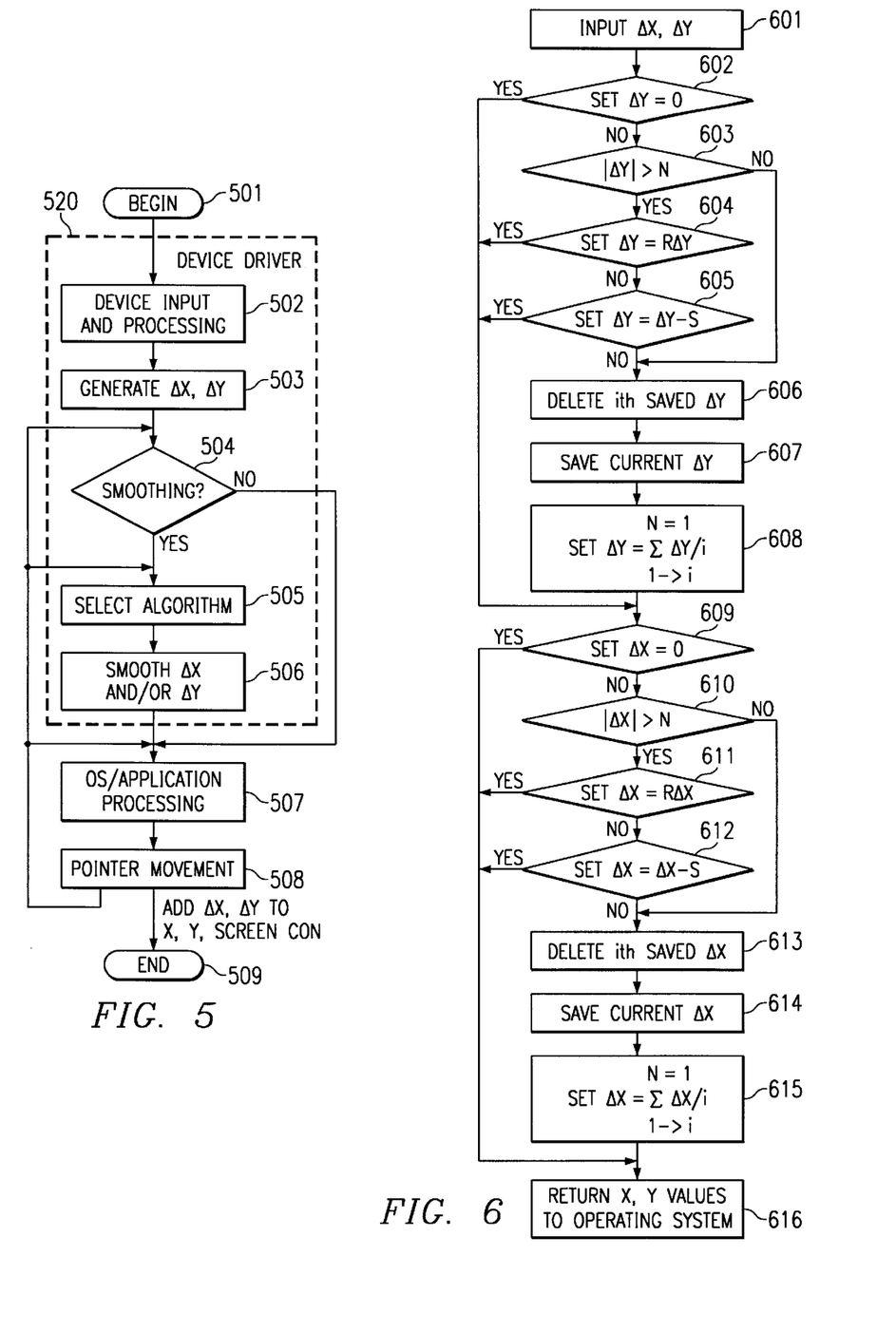
FIG. 5 illustrates the smoothing algorithm selecting and combining in detail of the present invention.
FIG. 6 illustrates one embodiment of the smoothing algorithm selection and implementation of the present invention.

FIG. 5 illustrates the smoothing algorithm selecting and combining in detail of the present invention. In the preferred embodiment of the present invention, the method of smoothing is performed by the device driver itself, rather than being performed in the operating system or application. Steps 502–506 within dotted line 520 are performed by a device driver in the depicted embodiment. However, the smoothing process may occur in either place. FIG. 5 describes the preferred embodiment. The method begins with the movement of a mouse or pointing device (step 501) which generates a signal that device driver recognizes as the device input and processes that signal (step 502). In a conventional pointing device that signal can be any one of or all of a magnitude of movement in an X direction, a magnitude of movement in a Y direction or a button function.

The device driver generates $\Delta X$ and $\Delta Y$ values from that input (step 503). Next, a determination whether to smooth or not is performed (step 504). Again, in this embodiment, the decision to smooth is a function of the device driver. However, rather than being totally a function of the device driver, the decision to smooth might be facilitated by the operating system, the application running on the operating system or even the user, through selection of a mouse button on the pointer. Alternatively, the user could initiate smoothing by selecting some predefined key or function on the keyboard. Again, the type of smoothing algorithm is selected (step 505) and the smoothing is applied to the $\Delta X$ and/or $\Delta Y$ values separately (step 506). At this point, the smoothed $\Delta X$ and $\Delta Y$ values leave the control of the device driver and are delivered to the operating system and application processing (step 507). The screen pointer movement then calculated by adding the smooth $\Delta X$ and $\Delta Y$ values to the present X and Y screen coordinates (step 508) with the process then terminating (step 509).

FIG. 6 illustrates one embodiment of the smoothing algorithm selection and implementation of the present invention. This embodiment the $\Delta X$ and the $\Delta Y$ which are calculated by the device driver are input. While both $\Delta X$ and $\Delta Y$ values are required to update the screen position, they are treated separately as far as the implementation of the smoothing algorithms are concerned. This will be apparent and discussed in greater detail below.

In this embodiment, the process begins by receiving $\Delta X$ and $\Delta Y$ inputs (step 601). With respect to these inputs, $\Delta Y$ is first considered. At 602 the determination must be made whether to set $\Delta Y$ to zero (step 602). The ultimate smoothing algorithm would be to set the incremental value or $\Delta X$ or $\Delta Y$ to zero. In other words, the cursor movement would not move in a particular direction at all. That is, the cursor movement would be smoothed to zero movement in that direction. This too will be discussed below, but it is important to note that at certain times in an application, GUI or image map, it might be important for someone who has poor motor function control or is unable to control a pointing device for one reason or another, to limit the movement of the mouse pointer on the screen. The easiest way to limit the movement of the mouse pointer on the screen is by allowing the mouse pointer to move in one axis only, i.e. set $\Delta Y=0$. If at this point it is decided to set $\Delta Y$ to zero, no further reason exists to process $\Delta Y$ and so the current value of AX and the smoothed value for $\Delta Y$, which would be set at zero, could be passed for smoothing of $\Delta X$ (step 609).

Assuming that $\Delta Y$ is not set to zero, then a smoothed value of $\Delta Y$ should be determined. The values of $\Delta X$ or $\Delta Y$ can be positive or negative, depending on the pointer movement with respect to the local pointer coordinate system. The first two algorithms are only limited by applying the smoothing effect to $\Delta X$ and $\Delta Y$ values when the value of $\Delta X$ and $\Delta Y$ are over a minimum amount. Therefore, absolute value of $\Delta Y$ is compared to some threshold value, N, to determine if $\Delta Y$ is over the minimum threshold value needed to trigger smoothing (step 603). If the absolute value of $\Delta Y$ does not exceed the threshold value, N, no need exists to smooth $\Delta Y$ with either of those two algorithms.

In that case, the process moves to step 606 for smoothing with the third algorithm. If, on the other hand, the magnitude of $\Delta Y$ does exceed the threshold value, then it must be determined if either of the first two smoothing algorithms should be applied. These algorithms can occur in either order. In this embodiment, it is first determined if $\Delta Y$ should be set to some percentage of $\Delta Y$ (step 604). So, if $\Delta Y$ exceeds a minimum value of N, multiply the value of $\Delta Y$ by some percentage, say ninety-five percent. In this specific example, if the threshold is set at 2 then if absolute value of $\Delta Y$ is less than 2, no smoothing algorithm would be applied to $\Delta Y$.

However, if the absolute value of $\Delta Y$ is greater than 2, then it would be reduced by some factor R, in this example, giving R a percentage factor of 0.95 if the value of $\Delta Y$ were to be 4, which is greater than 2, the smoothing factor of 0.95 would be applied to it. The result in $\Delta Y$ would be a value of 3.8. It can be clearly seen that there could be cases in which the $\Delta Y$ would be greater than N, the threshold value. But when the smoothing factor is applied, the value of $\Delta Y$ actually drops below the threshold value. While there is some discontinuity at this point, it can be reconciled by the fact that any $\Delta$ values greater than n are assumed to include invalid mouse movements attributed to unintended user input and therefore must be reduced. The magnitude is based only on the percentage. While the $\Delta Y$'s value immediately preceding the minimum value, say from 1.5 to 2, might be in a gray area where there could be erroneous mouse movements or could be the intended mouse movement. At these values, it might be better to err on the side of displaying too much mouse movement rather than not enough.

As said above, two smoothing algorithms are present that could be applied to $\Delta Y$ values, which are above a threshold value. The second smoothing algorithm is merely a scalar reduction. If it was determined at 604 not to reduce the $\Delta Y$ value by a percentage, it must then be determined if it is desirable to reduce $\Delta Y$ by a specific scalar amount, say S (step 605).

If that algorithm is not selected, the $\Delta Y$ value is dropped to the next block for processing. If it is selected, a constant S is subtracted from the $\Delta Y$ value. In the numbers given above if $\Delta Y$ has a value of 5, which is higher than a minimum number n of 2, giving S at 3, we would reduce $\Delta Y$ by 3 or have a result in $\Delta Y$ of 2.

Although not discussed with respect to either smoothing algorithm, if either of these algorithms are applied, no further need exists to process the $\Delta Y$ values. At that point both the smoothed $\Delta X$ and $\Delta Y$ values can be delivered to the $\Delta X$ processing section (step 609).

Assuming neither algorithm was used, both $\Delta$ values are delivered to the rolling averaging algorithm for processing (step 606).

In preparation for the rolling averaging smoothing, the $i^{th}$ saved $\Delta Y$ value is deleted from the rolling buffer (step 606). Next, the current $\Delta Y$ value is stored in the rolling buffer (step 607). The rolling buffer must have at least two memory places for at least two $\Delta Y$ values, in that case i equals 2. However, in the specific embodiment of this invention, ten are used. So, i equals 10. This smoothing function is a two-step process. The first step is to sum all of the values in the rolling buffer, i equals 10, sum all ten $\Delta Y$ values. Once the sum is determined, the sum is divided by the number of $\Delta Y$ values stored in the rolling buffer. In this case, i equals 10.

As can clearly be seen, using ten submissions of $\Delta Y$ and dividing by 10 requires considerable amount of pointer movement before any corresponding response is noted on the mouse pointer. Conversely, by using a fewer number of $\Delta Y$ values, large unintended pointer movements may not be smoothed out on the track of the mouse pointer. However, the number of submissions stored in the rolling buffer need not be ten. It can be any integer number greater than 1.

In other embodiments, the actual number of submissions can be determined by either the user or some function within the operating system or even by the application process.

At this point, some smooth value of $\Delta Y$ has been realized. Either by applying one of three smoothing algorithms or by setting $\Delta Y$ to zero. A duplicate process occurs for the raw $\Delta X$ value.

As above, it must first be determined if $\Delta X$ should be set to zero (step 609). If it is set to zero, there is no need to continue with this process again, and so $\Delta X$ and $\Delta Y$ can be delivered to the operating system and application process at step 616. Otherwise, the $\Delta X$ value is transferred to the absolute value comparison (step 610).

Next, the absolute value of $\Delta X$ is compared to a threshold value, N (step 610). The process is identical to that which occurred with respect to $\Delta Y$ and will not be discussed in the amount of detail in which the process of smoothing $\Delta Y$ was discussed. If the absolute value $\Delta X$ does not exceed the threshold value, then $\Delta X$ bypasses the scaler and percentage function algorithms and moves directly to the rolling averages algorithm (step 613).

Assuming the absolute value of $\Delta X$ exceeds some minimum value, it is then determined if smoothing is necessary by applying a percentage multiplier algorithm. As is mentioned above, the $\Delta X$ value is multiplied by some percentage and the result in smooth $\Delta X$ is delivered to the operating system and the application processing (step 616).

If it is determined that percentage multiplier algorithm is not the proper smoothing algorithm, the value of $\Delta X$ is then transferred next to the scalar subtraction algorithm. That algorithm is applied to the value of $\Delta X$ so that $\Delta X$ is merely reduced by some constant S. If it is decided to use the scalar subtraction algorithm, the smoothed value of $\Delta X$ is delivered to the operating system and application processing block 616. If not, the value of $\Delta X$ proceeds into the rolling average algorithm (step 613). Again, the $i^{th}$ $\Delta Y$ is deleted from the rolling buffer, and the current value of $\Delta X$, which has not been smoothed, is stored in the rolling buffer (step 614).

The rolling averages smoothing algorithm proceeds in two steps. First, the i number of $\Delta Y$ values stored in the rolling buffer are summed. Next, that sum is divided by the number of submissions or $\Delta Y$ stored in the rolling buffer, i (step 615). Again, i can be any number of submissions. For this example, the number 10 was chosen. However, any number, 2 and above, can be used. At this point, the smooth X value is delivered to the operating system and application processing.

In further refinement of the method illustrated in FIG. 6, when considering whether or not to apply the percentage multiplier smoothing algorithm or the straight subtraction method, it must first be determined whether the value of $\Delta Y$ exceeded a threshold value. In another embodiment of the present invention, rather than initiating the algorithms by checking the absolute value of $\Delta Y$ to a minimum value, $\Delta Y$ could first be smoothed by one of the two algorithms and then compared to the threshold value. In that case, if the smooth value of $\Delta Y$ fell below the threshold, the threshold value n would be used in its place. As noted above, discontinuity occurs when in some cases the smooth value of $\Delta Y$ can drop below the threshold value by applying the algorithm and then checking this discontinuity cannot occur because the smooth value itself is compared against the minimum value rather than the raw value of $\Delta Y$.

FIG. 7 is a tabular listing illustrating the results of several possible smoothing algorithms on the mouse pointer position. Table 700 in FIG. 7 contains 50 submissions of raw $\Delta X$ and $\Delta Y$ values which resulted from user actuation of the mouse. The first submission, for instance, contains a $\Delta X$ of 1 and a $\Delta Y$ of 0, meaning the user caused the mouse to move one unit in the X direction and no units in the Y direction. That movement resulted in the mouse pointer moving to a position of (25,0) on the screen.

The next mouse movement is 5 units in the X direction and 2 in the Y direction, which is indexed in the row of submission 2, which causes the mouse pointer to move to a new position of (30,2). The new mouse pointer position is easily calculated from the old mouse position by adding a $\Delta X$ of 5 to the old X value of 25 and a $\Delta Y$ of 2 to the old Y value of 0.

The third submission is similar, $\Delta X$ equaling 7 and $\Delta Y$ equaling 3 results in the mouse pointer moved to a new position of (37,5). The $X_{raw}$, $Y_{raw}$ mouse positions are merely screen positions of the mouse pointer calculated by adding the new $\Delta X$ and $\Delta Y$ values to the previous mouse pointer position.

The next two columns are the rolling averages mouse positions. As discussed earlier, rolling averages in the preferred embodiment require 10 values of X and 10 values of Y in order to calculate a valid screen position. This requirement is present in this embodiment because it has been assumed throughout that i=10. Therefore, each rolling buffer contains 10 spaces for 10 values of ΔX and 10 spaces for 10 values of ΔY. Those values are summed, divided by the number of values contained in the rolling buffer, i, in this case it is 10, and added to the old mouse pointer position.

So, for instance, submission 21 has a ΔX of −4 and a ΔY of 3. Using the rolling averages algorithm once the new ΔX and ΔY have been sent to the rolling buffer, the $i^{th}$ value of both the ΔX and ΔY are deleted from the rolling buffer. In this case, the $i^{th}$ value, being 10 would result in the $11^{th}$ submission, ΔX equals 6 and ΔY equals 4, being dropped from the rolling buffer. In order to calculate a new mouse pointer position using the rolling averages algorithm, submissions 21–12 of both the ΔX and ΔY are then summed, divided by 10 and added to the last screen position.

Note carefully that the screen position is that which was calculated by the algorithm being used. So, in this case, the $20^{th}$ submission screen position for the rolling algorithm would be (36.82963,43.60952). The new mouse pointer position would be (34.82936,46.50952). The actual smoothed ΔX and ΔY values could be rounded.

Other algorithms include the percentage multiplier algorithm. The percentage multiplier algorithm merely multiplies ΔX and/or ΔY values by some smooth factor equal to a percentage of ΔX and/or ΔY and then adds those values to the previous mouse pointer position. In this example, a smoothing percentage of 0.95 or 95% of Δ is used, which results in a lightly smoothed mouse pointer track. Further in this example, a value of 2 has been used as a threshold value. So, in order for the smoothing algorithm to be applied, the ΔX and ΔY must be above 2. In this specific example, submission 11 contains a ΔX of 6 and a ΔY of 4. Both ΔX and ΔY values being greater than 2, the percentage multiplier algorithm is then applied to both ΔX and ΔY values. Those values are added to the last mouse pointer position. The last mouse pointer position being (31.95,16.35) and 95% of 6 equaling 5.7 brings the new X position of the mouse pointer to 47.65 and 95% of 4 being 3.8 brings the new Y position to 20.15 resulting in a new mouse pointer position of (47.65,20.15).

The following algorithm discussed is the straight subtraction or scalar subtraction smoothing algorithm. Just as in percentage multiplier, first check to see if the ΔX and ΔY values are above a set threshold. Once it is confirmed that the ΔX and ΔY values are above that threshold, the ΔX and ΔY values are reduced by a scalar amount. As in the percentage multiplier method, the greater the amount, the more the smoothing effect. In the specific example, submission 36 contains a ΔX of 7 and a ΔY of 4. Both 7 and 4 are greater than 2, so they are reduced by a scalar amount. In this case, the scalar amount equals 1 resulting in a light smoothing effect on the mouse pointer position. At submission 35, the mouse pointer was at (2,12). So, by reducing each ΔX and ΔY by 1, the new mouse pointer position is (8,15).

Figure 8:
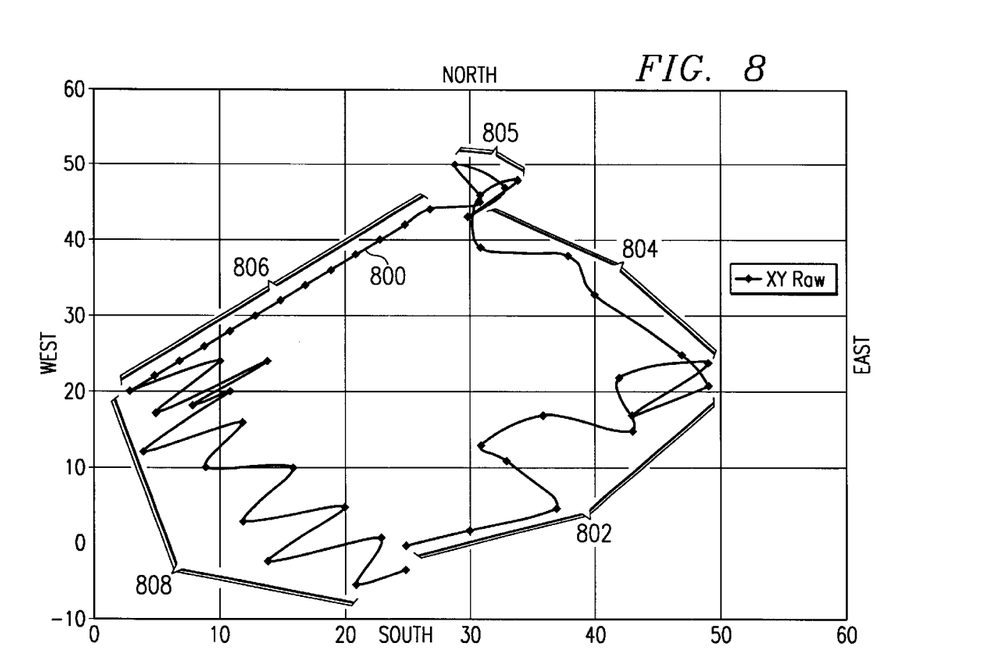
FIG. 8 represents an unsmoothed mouse pointer track.

One cannot fully appreciate the benefits of the present invention without seeing the application of the present invention on a mouse pointer track 800. FIG. 8 represents an unsmoothed mouse pointer track. The number of points on the curve $X_{raw},Y_{raw}$ for track 800 in FIG. 8 corresponds to the submissions of FIG. 7. FIG. 8 is merely exemplifying what might occur when the user has poor manual dexterity or a young user attempts to move the mouse pointer from a lower position on the screen, south, to a center right position, west, to an upper center position, north, to a center left position, east, and then return the mouse pointer to its original south position, on the display screen.

Before going on to the next figure, note carefully that the mouse pointer track 800 contains 5 distinct track sections. These sections are labeled only on mouse pointer track 800 for clarity. The first track section, 802, is taken from submission 1–12 where the mouse pointer track is irregular, but seems to maintain some control as might be deduced because each swing has multiple submission points. Compared to a track section 808 from submission 35 to 50 where each swing contains only 1 point. Another track section 804, from 12–17 seems to be a fairly controlled track without any apparent fluctuation or trembling. In track section 805, from submissions 17–21, the user appears to have had trouble negotiating the top of the chart resulting in what appears to be several circular motions. The track continues on in a relatively straight direction at track section 806, from submission 25–35. There the user undoubtedly is in complete control, moving the mouse at a regular pace, straight track across the upper left quadrant of the screen, north to west.

Finally, moving in track section 808, from submission 35–50, the user seems to encounter some difficulty in negotiating the turn and moving back to the original mouse position. There each new submission seems to have resulted from violent hand motion in one direction and the next submission in the opposite direction still showing a general tendency towards the original mouse position which is the user's ultimate destination.

Figure 9:
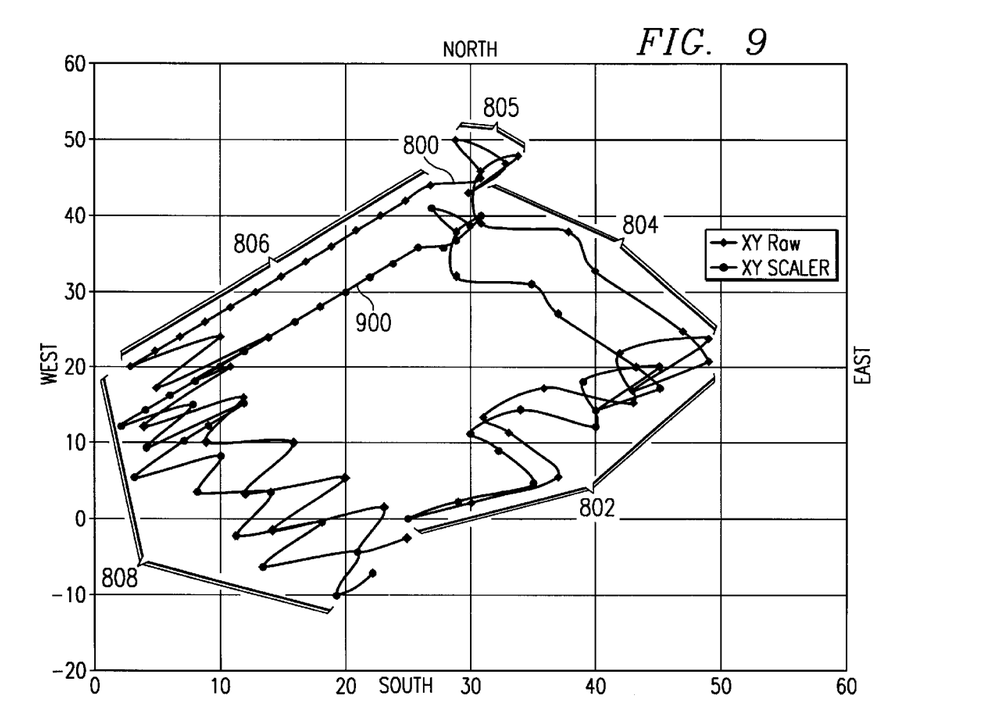
FIG. 9 illustrates a mouse pointer track smoothed by a scalar smoothing algorithm, superimposed on the raw mouse pointer track of FIG. 8.

FIG. 9 illustrates the mouse track 900 smoothed by a scalar smoothing algorithm, superimposed over the raw mouse track 800 of FIG. 8. The mouse pointer track smoothed by the scalar subtraction smoothing algorithm again, only light smoothing scalar factor was applied to the raw ΔX and ΔY values. Both mouse pointer tracks contain roughly the same character, one merely being a scalar coordinate shift of the other. The scalar subtraction track is merely a translation of the raw ΔX and ΔY curves. However, because each new mouse pointer position is the smooth ΔY and ΔX values added to the last mouse pointer position, it is not a true translation, but rather an adaptive translation built from one point to the next.

Figure 10:
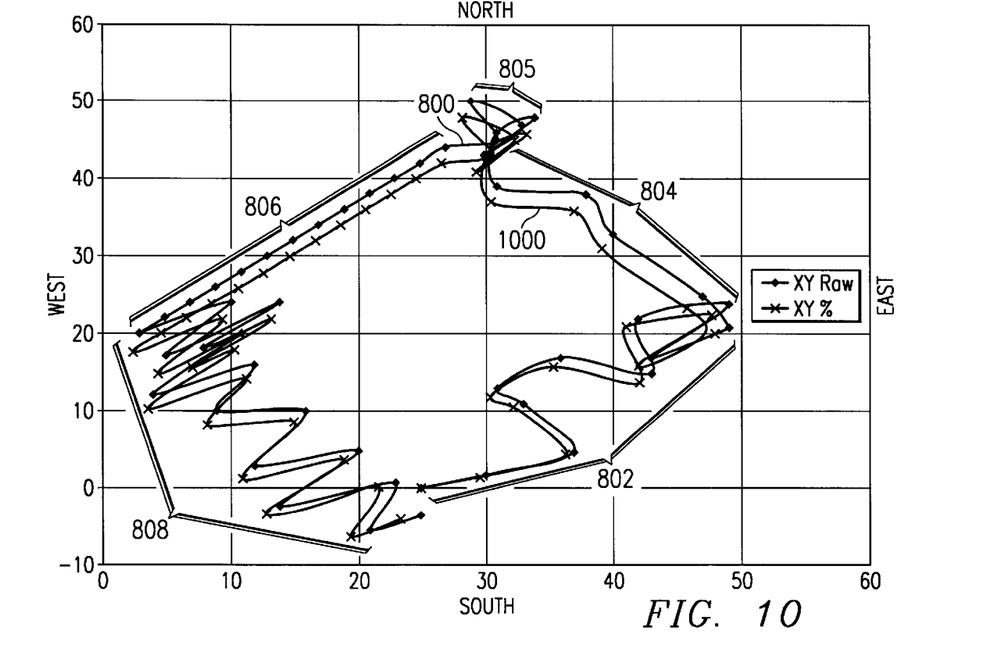
FIG. 10 illustrates a mouse pointer track smoothed by a percentage multiplier smoothing algorithm, superimposed on the raw mouse pointer track of FIG. 8.

FIG. 10 illustrates a mouse track 1000 smoothed using a percentage multiplier smoothing algorithm, superimposed on the raw X,Y mouse position track 800 from FIG. 8. Remembering here that a percentage multiplier of 0.95 was used to smooth the ΔX and ΔY values and that 0.95 has only a light smoothing effect on the ΔX and ΔY values. Unlike the straight subtraction smoothing algorithm, the percentage multiplier algorithm, while producing the same character as the raw X, Y mouse pointer track, is not merely a translation of the raw mouse track. Instead the percentage multiplier actually provides some amount of dampening against large ΔX and ΔY moves. Unlike the prior art, smoothing, rather then being temporal, this dampening is spatial. Therefore, the filtering effect occurs at each position rather than just when the mouse speed is moving rapidly. That is, of course, when the ΔX and ΔY values exceed the threshold, in this case which was set at a value of 2.

In looking at both FIG. 9 and 10 as a whole, neither the scalar subtraction smoothing algorithm nor the percentage multiplier smoothing algorithm have much effect on the areas of the mouse track in which the user had difficulty in controlling the mouse. For instance, track section 808, from submission 35–50 on both curves, the character remains generally the same, although somewhat dampened in FIG. 10. In the track section 805 submissions 17–21, in which the user seemed to have difficulty negotiating a turn, no real distinction can be made from the raw mouse track to either the smooth track using the straight subtraction or percentage algorithms. Clearly, more smoothing effect could be gained by increasing the percentage multiplier or increasing the scalar subtraction amount. However, the point to be made is that because in each case the smoothing algorithm acts only on a single $\Delta X$ and $\Delta Y$ value, the character of the curve will remain roughly the same. In other words, the unintended jerks and trembles of a user who lacks manual dexterity to handle a mouse will still be translated to the mouse pointer by some amount. And, because only a single $\Delta X$ or $\Delta Y$ value is being operated on by the smoothing algorithm, the magnitude of smoothing correction needed to present some effect on this may be great, resulting in a loss of definition on areas in which the user maintained better control of the mouse.

Figure 11:
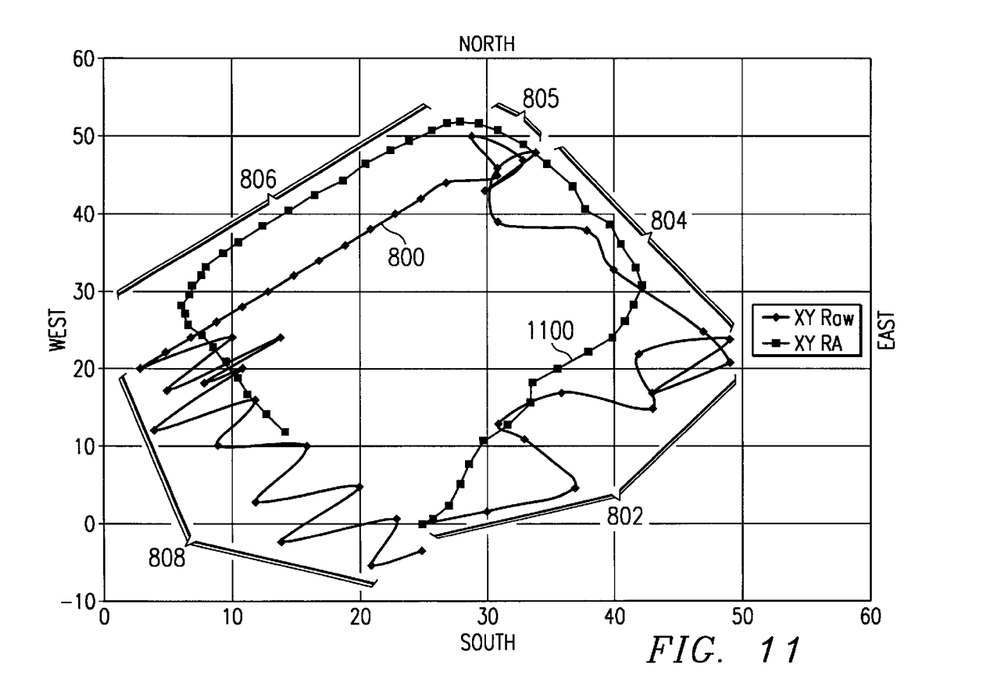
FIG. 11 illustrates a mouse pointer track smoothed by the application of the rolling averaging algorithm, superimposed on the raw mouse pointer position track of FIG. 8.

FIG. 11 illustrates a mouse pointer track 1100 smoothed by the application of the rolling averaging algorithm superimposed on the raw mouse pointer position track 800. It is apparent at first glance that the rolling averaging algorithm has completely smoothed all erratic mouse movements from the mouse pointer track. Remembering, first, that the first ten submissions did not contain a prerequisite number of $\Delta X$ and $\Delta Y$ values in the rolling buffers, so more smoothing actually occurred during those submissions. Regardless, the rolling averaging smoothing algorithm when applied to this raw mouse pointer track smoothes each different type of unintended mouse movement.

For instance, notice track section 805 submissions 17–22 where the user apparently had difficulty in negotiating the corner at the top of the screen. Submission 17–22 on the smoothed track exhibits no such difficulty. Note on the raw mouse pointer track submissions 17–22 results in erratic movement in all directions, while the smooth curve results in a generally flat curve which moves diagonally up and to the left of the screen.

This smooth track results from a number of factors, not the least of which being that because the smoothing curve uses more than one submission, erratic motions resulting from the user's hand moving in one direction and then another direction and then back to the first direction are generally averaged out. The rolling average algorithm has the same effect on circular mouse pointer tracks, and instead of moving a mouse in a straight line, would actually move the mouse in a series of circular movements from a beginning screen position to a final screen position.

Finally, note track section 808 submissions 35–50 on the raw mouse pointer curve. This mouse pointer track is cyclic back and forth mouse motions. Again, because of the averaging effect of the rolling average algorithm which sums a first $\Delta Y$ value with the next and then averages by the number of $\Delta Y$ values, irregular motions which oppose each other in one direction and the next tend to cancel each other out. The submissions 35–50 generally show this.

However, note that submissions 35–44 on the smoothed curve trace from right angle curve and yet 35–44 on the raw curve generally head in a southeasterly direction on the screen. The reason for this apparent inconsistency is due to the averaging aspect of the algorithm. While the smooth mouse pointer track does eventually head to the southeast, it must first cycle through a long line of regularly spaced controlled $\Delta X$ and $\Delta Y$ values from submission 23–submission 35 because this is an averaging algorithm the momentum of that data stored in memory must be completely overcome before the track can be influenced in the next direction. Therefore, it is not until submission 45 that the last of the straight line submission points have been deleted from the rolling buffer and the smoothing algorithm considers only those submissions which are formed from the erratic portion of the raw X,Y curve of submission points 35–50.

Another embodiment of the present invention, rather than smoothing a $\Delta X$ or $\Delta Y$ value with a smoothing factor, the $\Delta X$ or $\Delta Y$ value could be set to zero. Therefore, no matter what the user inputs with a mouse, the mouse pointer will traverse the screen in only one axial direction. This feature is particularly important, especially in the case of expanding application menus.

Once a user decides to expand a menu, such as a drop-down menu, the user moves the mouse to the hot spot which is usually located on a menu bar at the appropriate menu selection. From there the user can initiate the menu expansion by clicking the mouse or some other keyboard button, or alternatively, the hot spot associated with the menu item may automatically expand the menu or drop the menu down. Regardless which action opens the menu, once the drop-down menu has expanded, the drop-down menu itself becomes the hot spot. As the user traverses the drop-down, the different selections within the drop-down or highlight as a mouse pointer comes in contact with a hot spot associated with that drop-down menu item. However, in the case of a user who does not possess the motor skills necessary to keep the mouse pointer on the drop-down menu, the drop-down menu will close or collapse once the mouse pointer leaves the area of the drop-down menu. This requires the user to reopen the menu.

An advantage of the present invention is to limit the mouse movement to only the direction of the drop-down menu. For instance, if the drop-down menu dropped in the Y direction, the smoothing algorithm would automatically set $\Delta X$ to zero, thereby eliminating the possibility of the user accidentally moving off the menu in the X direction. The user might have to exit the menu area in the Y direction, either on top or bottom of the menu. In another embodiment, if the user does not have sufficient control in the Y direction, it might be necessary to combine a second smoothing algorithm in order to smooth the mouse pointer in the Y direction. Examples are illustrated in FIGS. 8–11. Of course, FIGS. 8–11 illustrate the smoothing in both the X and Y direction, whereas this embodiment would merely be in the $\Delta X$ or $\Delta Y$ direction.

While drop-down menus generally drop down or expand in the Y direction, other menus such as folders or metaphorical notebooks expand from the X direction. In that case, $\Delta Y$ would be set to zero and any other smoothing algorithm would be applied to the $\Delta X$ for smoothing curve in the X direction.

Other embodiments of the present invention include determining whether to select and apply a smoothing or correcting algorithm by either manually by a user designation or automatically on the basis of position of the mouse pointer on the screen. Still other embodiments include determining which algorithm to apply by either manually by a user designation or automatically on the basis of position of the mouse pointer on the screen. Still other embodiments include determining whether to select and apply a smoothing or correcting algorithm and/or determining which algorithm to apply by examining a history of previous mouse pointer tracks to determine the need for smoothing and to match a corresponding smoothing algorithm with the mouse pointer history. Because the position of the mouse pointer on the display screen is intended to correspond to display objects associated with either the operating system or applications, automatic initiation and/or selection of smoothing algorithms can be implemented in either the operating system or application in addition to the device drivers.

The embodiments disclosed within are in no way intended to limit the application of the present invention. One of ordinary skill in the art would realize that the embodiments are merely exemplary and would understand that many of the features could be combined together or with other techniques for practicing the invention.

The present invention provides stability for a user who doesn't have the motor control or skills needed to control a mouse pointer with a mouse. Without the reliance on temporal based filtering, the present invention smoothes the mouse pointer track based entirely by spatial smoothing. Further, the present invention provides several embodiments for implementing the functions either in the device driver or application layer. In addition, the present invention provides several means in which to implement the present invention such as by initiating smoothing from the use control mouse or automatically from the mouse driver, or application, or even via the operating system.

What is claimed is:

1. A method for processing input parameters for a computer system pointing device comprising:
    receiving movement information from the computer system pointing device, wherein the movement information includes an amount of movement;
    in response to the amount of movement exceeding a threshold, applying a spatial smoothing function to the movement information; and
    outputting spatially smoothed movement information.

2. The method recited in claim 1, further comprising:
    selecting the spatial smoothing function.

3. The method recited in claim 1, further comprising:
    determining whether to apply the spatial smoothing function after receiving the movement information.

4. The method recited in claim 1, wherein the spatial smoothing functions include one of replacing the movement information, subtraction from the movement information, percentage multiplier to the movement information, and averaging a history of the movement information.

5. The method recited in claim 1, further comprising:
    generating movement information from a user action utilizing a pointer device, where in the pointer device is any user actuated interface device.

6. The method recited in claim 2, selecting the spatial smoothing function by:
    examining the movement information.

7. The method recited in claim 3, determining whether to apply the spatial smoothing function by:
    examining the movement information.

8. The method recited in claim 3, wherein the step of determining whether to apply the spatial smoothing function being performed by one of a user, a device driver, an operating system or an application.

9. The method recited in claim 1, the step of applying the spatial smoothing function further comprises:
    setting a component of the movement information to a pre-selected value.

10. The method recited in claim 1, the step of applying the spatial smoothing function further comprises:
    subtracting a pre-selected value from a component of the movement information.

11. The method recited in claim 1, the step of applying the spatial smoothing function further comprises:
    multiplying a component of the movement information by a pre-selected value.

12. The method recited in claim 1, the step of applying the spatial smoothing function further comprises:
    averaging a component of the movement information with corresponding components of pre-occurring movement information.

13. The method recited in claim 2, further comprising:
    selecting a smoothing function;
    applying the smoothing function to the spatially smoothed movement information; and
    outputting smoothed and spatially smoothed movement information.

14. The method recited in claim 2, wherein the step selecting the spatial smoothing function comprises:
    determining cursor screen position; and
    selecting the spatial smoothing function based on cursor screen position.

15. The method recited in claim 3, wherein the step determining whether to apply the spatial smoothing function comprises:
    determining cursor screen position; and
    determining whether to apply the spatial smoothing function on cursor screen position.

16. An apparatus for processing input parameters for a computer system pointing means comprising:
    receiving means for receiving movement information, wherein the movement information includes an amount of movement;
    application means, responsive to the amount of movement exceeding a threshold, for applying a spatial smoothing function to the movement information; and
    outputting means for outputting spatially smoothed movement information.

17. The apparatus recited in claim 16, further comprising:
    selecting means for selecting the spatial smoothing function.

18. The apparatus recited in claim 16, further comprising:
    determining means for determining whether to apply the spatial smoothing function after receiving the movement information.

19. The apparatus recited in claim 17, wherein the spatial smoothing functions include one of replacing the movement information, subtraction from the movement information, percentage multiplier to the movement information and averaging a history of the movement information.

20. The apparatus recited in claim 16, further comprising:
    generating means for generating movement information from a user action utilizing a pointer device, wherein the pointer device is any user actuated interface device.

21. The apparatus recited in claim 17, selecting means for selecting the spatial smoothing function further comprising:
    means for examining the movement information.

22. The apparatus recited in claim 18, determining means for determining whether to apply the spatial smoothing function further comprising:
    means for examining the movement information.

23. The apparatus recited in claim 18, wherein the determining means for determining whether to apply the spatial smoothing function being performed by one of a user, a device driver means, a means for processing or an application means.

24. The apparatus recited in claim 16, the means for applying the spatial smoothing function further comprises:
    means for setting a component of the movement information to a pre-selected value.

25. The apparatus recited in claim 16, the means for applying the spatial smoothing function further comprises:

subtraction means for subtracting a pre-selected value from a component of the movement information.

26. The apparatus recited in claim 16, the means for applying the spatial smoothing function further comprises:
multiplication means for multiplying a component of the movement information by a pre-selected value.

27. The apparatus recited in claim 16, the means for applying the spatial smoothing function further comprises:
averaging means for averaging a component of the movement information with corresponding components of pre-occurring movement information.

28. The apparatus recited in claim 17, further comprising:
selecting means for selecting a smoothing function;
applying means for applying the smoothing function to the spatially smoothed movement information;
outputting means for outputting smoothed and spatially smoothed movement information.

29. The apparatus recited in claim 17, wherein the selecting means for selecting the spatial smoothing function comprises:
determining means for determining cursor screen position; and
selecting means for selecting the spatial smoothing function based on cursor screen position.

30. The apparatus recited in claim 18, wherein the determining means for determining whether to apply the spatial smoothing function comprises:
determining means for determining cursor screen position; and
determining means for determining whether to apply the spatial smoothing function on cursor screen position.

31. A computer program product comprising computer code instructions embodied on a computer readable medium for enabling input parameters for a computer system pointing device, comprising:
instructions for receiving movement information wherein the movement information includes an amount of movement;
instructions for applying a spatial smoothing function to the movement information in response to the amount of movement exceeding a threshold; and
instructions for outputting spatially smoothed movement information.

32. The computer program product instructions recited in claim 31, further comprising:
instructions for selecting the spatial smoothing function.

33. The computer program product instructions recited in claim 31, further comprising:
instructions for determining whether to apply the spatial smoothing function after receiving the movement information.

34. The computer program product instructions recited in claim 32, wherein the spatial smoothing functions include one of replacing the movement information, subtraction from the movement information, percentage multiplier to the movement information and averaging a history of the movement information.

35. The computer program product instructions recited in claim 31, further comprising:
instructions for generating movement information from a user action utilizing a pointer device, wherein the pointer device is any user actuated interface device.

36. The computer program product instructions recited in claim 32, instructions for selecting the spatial smoothing function further comprising:
instructions for examining the movement information.

37. The computer program product instructions recited in claim 33, instructions for determining whether to apply the spatial smoothing function comprising:
instructions for examining the movement information.

38. The computer program product instructions recited in claim 33, wherein the instructions for determining whether to apply the spatial smoothing function being executed by one a device driver, an operating system or an application.

39. The computer program product instructions recited in claim 31, the instructions for applying the spatial smoothing function further comprises:
instructions for setting a component of the movement in formation to a pre-selected value.

40. The computer program product instructions recited in claim 31, the instructions for applying the spatial smoothing function further comprises:
instructions for subtracting a pre-selected value from a component of the movement information.

41. The computer program product instructions recited in claim 31, the instructions for applying the spatial smoothing function further comprises:
instructions for multiplying a component of the movement information by a pre-selected value.

42. The computer program product instructions recited in claim 31, the instructions for applying the spatial smoothing function further comprises:
instructions for averaging a component of the movement information with corresponding components of pre-occurring movement information.

43. The computer program product instructions recited in claim 32, further comprising:
instructions for selecting a smoothing function;
instructions for applying the smoothing function to the spatially smoothed movement information;
instructions for outputting smoothed and spatially smoothed movement information.

44. The computer program product instructions recited in claim 32, wherein the instructions for selecting the spatial smoothing function comprises:
instructions for determining cursor screen position; and
instructions for selecting the spatial smoothing function based on cursor screen position.

45. The computer program product instructions recited in claim 33, wherein the instructions for determining whether to apply the spatial smoothing function comprises:
instructions for determining cursor screen position; and
instructions for determining whether to apply the spatial smoothing function on cursor screen position.

46. A pointing device driver for processing input parameters comprising:
logic for receiving movement information from a computer system pointing device, wherein the movement information includes an amount of movement;
logic for applying a spatial smoothing function to the movement information in response to the amount of movement exceeding a threshold; and
logic for outputting spatially smoothed movement information.

47. A pointing device for processing input parameters comprising:
pointer device means for generating smoothed movement signals comprising:
movement information generation means for generating movement information from device movement, wherein the movement information includes an amount of movement;

application means applying a spatial smoothing function to the movement information in response to the amount of movement exceeding a threshold; and outputting means for outputting spatially smoothed movement information; and operating system means for processing the outputted spatially smoothed movement information.

48. A pointing device driver for processing input parameters comprising:

input means for detecting user actuated movement;

conversion means for converting user actuated movement to movement information wherein the movement information includes an amount of movement;

application means, responsive to the amount of movement exceeding a threshold, for applying a spatial smoothing function to the movement information; and outputting means for outputting spatially smoothed movement information.

49. A computer program module comprising computer code instructions embodied on a computer readable medium for processing input parameters for a computer system pointing device, comprising:

instructions for receiving movement information wherein the movement information includes an amount of movement;

instructions for applying a spatial smoothing function to the movement information in response to the amount of movement exceeding a threshold; and instructions for outputting spatially smoothed movement information.

50. A method for adjusting movement input parameters from a computer system pointing device, comprising:

receiving, from the computer system pointing device, movement information representing physical actuation of the computer system pointing device wherein the movement information includes an amount of physical actuation;

applying a spatial smoothing function to the movement information to generate spatially smoothed movement information in response to the amount of physical actuation exceeding a threshold; and outputting the spatially smoothed movement information.

51. A method for processing input parameters for a computer system pointing device comprising:

receiving movement information from the computer system pointing device, wherein the movement information reflects a non-zero amount of movement of the computer system pointing device;

determining, based on a magnitude of the non-zero amount of movement of the computer system pointing device, whether to apply a function to the movement information;

selecting a spatial smoothing function in response to a determination to apply a function to the movement information;

applying the spatial smoothing function to the movement information in response to a selection of the spatial smoothing function; and outputting spatially smoothed movement information.

52. The method recited in claim 51, wherein the spatial smoothing function is invoked in response to a screen pointer moving across a selected area on the screen.

53. The method recited in claim 51, wherein the spatial smoothing function is invoked in response to a value of an X axis or a value of a Y axis which is generated from the computer system pointing device.

54. The method recited in claim 51, wherein the spatial smoothing function is invoked by one of a user, a device driver, an operating system or an application.

55. The method recited in claim 1, wherein the selecting step selects at least two different smoothing functions for application to the movement information.

56. The method of claim 51, wherein the spatial smoothing is selected to smooth data in the movement information generated by user motor skills.

57. The method recited in claim 1, wherein the spatial smoothing function is applied only to an X axis direction of movement.

58. The method recited in claim 1, wherein the spatial smoothing function is applied only to a Y axis direction of movement.

59. The method recited in claim 1, wherein the spatial smoothing function does not allow movement in an X axis direction.

60. The method recited in claim 1, wherein the spatial smoothing function does not allow movement in a Y axis direction.

* * * * *